United States Patent [19]

Steidel

[11] 3,807,930
[45] Apr. 30, 1974

[54] DEVICE FOR THE PRODUCTION OF AN ANNULAR BULGE AT THE END OF A PLASTIC PIPE SERVING AS A SEALING ELEMENT

[75] Inventor: Franz Steidel, Gutersloh, Germany

[73] Assignee: Deutsche Tecalemit Gesellschaft m.b.H., Windelsbleiche, Germany

[22] Filed: Nov. 9, 1972

[21] Appl. No.: 304,934

[30] Foreign Application Priority Data
Nov. 9, 1971    Germany............................ 7142760

[52] U.S. Cl..................... 425/392, 65/296, 65/299, 72/317
[51] Int. Cl............................................ B29c 17/02
[58] Field of Search .............. 425/392, 393; 72/317; 65/296, 299; 264/320, 339

[56] References Cited
UNITED STATES PATENTS
| | | | |
|---|---|---|---|
| 195,411 | 9/1877 | Slim...................................... | 65/296 |
| 3,466,707 | 9/1969 | Click et al. ..................... | 425/392 X |
| 3,482,282 | 12/1969 | Glasschroeder ................ | 425/392 X |

FOREIGN PATENTS OR APPLICATIONS
880,666   10/1961   Great Britain........................ 65/299

Primary Examiner—Robert L. Spicer, Jr.
Attorney, Agent, or Firm—Watson, Cole, Grindle & Watson

[57]   ABSTRACT

A manually operated tube upsetting tool for producing an annular bulge serving as a sealing element at the end of a plastics tube, comprising a pair of mutually opposed tube clamping jaws mounted so as to define a substantially cylindrical tube clamping chamber at the inner end of which is an upsetting chamber, a housing in which the jaws are movable away or toward a tube so as to engage a tube being upset, said housing having an extension forming one handle, an actuating lever pivotally mounted on the housing being an extension forming a clamping portion and a further extension forming a second handle, said clamping portion acting so as to move at least one jaw into clamping engagement with the tube, an upsetting ram axially movable into the clamping chamber, an upsetting lever pivotally mounted so that one end is linked to the ram and the other end is pressed by resilient means against the actuating lever, whereby a gripping force being applied across the two handles causes the upsetting ram to force the end of a clamped tube into the upsetting chamber.

9 Claims, 1 Drawing Figure

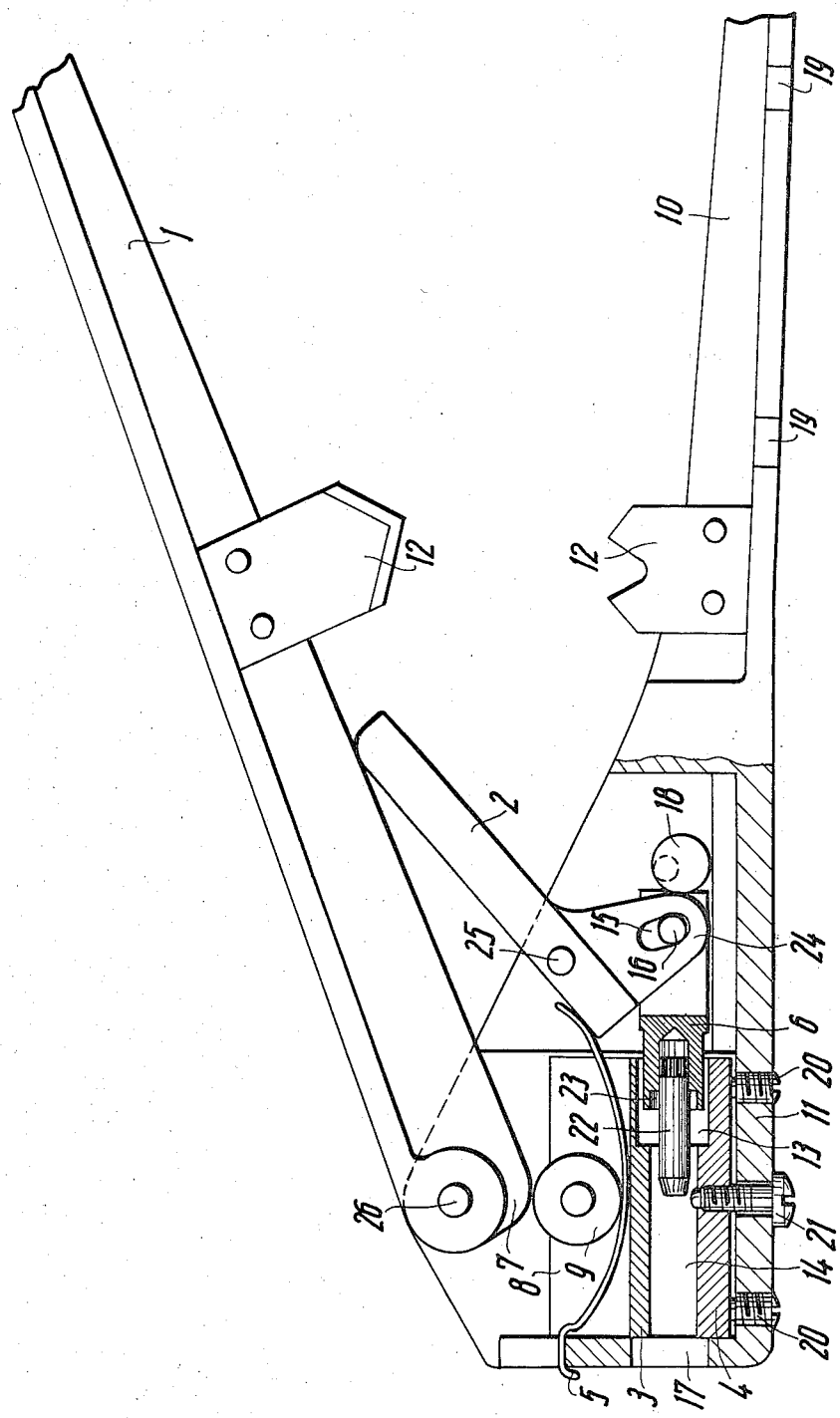

DEVICE FOR THE PRODUCTION OF AN ANNULAR BULGE AT THE END OF A PLASTIC PIPE SERVING AS A SEALING ELEMENT

The invention relates to a device for producing an annular sealing bulge at the end of a plastics tube which is to be received in a screw coupling.

The Applicant has considered that, to enable plastics tubes to be received in screw coupling, an annular bulge should be produced at the end of the plastics tube by an upsetting process, the said bulge serving as sealing element for the screw coupling, so that it is unnecessary to use a special sealing element as has hitherto been the case.

The Applicant has further considered a device for producing such an annular bulge on a plastics tube which consists of an exchangeable manually operable clamp device having two clamp jaws, surrounding the tube leaving the free end which is to be bulged, and an upsetting ram, also manually operated, carried in an axial bore of the clamp device formed in the vicinity of the free end of the tube, engaging on the end face of the tube, partly gripping over the free end of the tube and having a pin engaging through the free end of the tube. The said upsetting ram has on its end face an annular recess surrounding the pin, corresponding to the wall thickness of the tube, for receiving the free end of the tube, the base of the guide bore in the clamp jaws and the end face of the recess of the upsetting device enclosing a chamber for the reception of the bulging. This device makes it possible for the assembler to cut off at each assembly station from a drum the tube lengths required at the time and to produce the annular bulge at both ends of the said tube lengths by upsetting the tube. With this device the jaws of the clamp device are picked up in the two arms of a pair of pincers, so that by the compression of the arms of the pincers the tube is clamped in the clamp device. The upsetting ram is picked up on a third arm, which lies pivotably between the two arms of the clamping pincers and is movable perpendicularly in relation to the arms of the clamping pincers. This device accordingly has three arms, it being necessary for the arms of the clamping pincers to be closed first, whereupon the arm actuating the upsetting ram must be moved perpendicularly to the direction of closing of the arms of the pincers. The device is difficult to manipulate since both hands are required for its operation since there are three pincer arms which have to be operated.

An object of the invention is based on the problem of improving the device considered by the Applicant by effecting with simple structural design the clamping operation and the upsetting operation by the closure movement of two pincer arms.

The present invention consists in a manually operable tube upsetting tool for producing an annular bulge serving as a sealing element at the end of a plastics tube, comprising a pair of mutually opposed tube clamping jaws mounted so as to define a substantially cylindrical tube clamping chamber at the inner end of which is an upsetting chamber, a housing in which the jaws are movable away or toward a tube so as to engage a tube being upset, said housing having an extension forming one handle, an actuating lever pivotally mounted on the housing being an extension forming a clamping portion and a further extension forming a second handle, said clamping portion acting so as to move at least one jaw into clamping engagement with the tube, an upsetting ram axially movable into the clamping chamber, an upsetting lever pivotally mounted so that one end is linked to the ram and the other end is pressed by resilient means against the actuating lever.

The lower clamp jaw may be fixed in the bottom of the housing so as to be adjustable in height and the upper height-adjustable jaw has a guide body slidingly received between the side walls of the housing. Approximately in the centre of the said guide body a pressure roll is arranged which is held by spring action in abutment against a pressure cam of the clamp lever.

Furthermore the upsetting lever at its end facing the upsetting ram may have a downwardly projecting arm which has a slit-shaped through bore lying transversely to the direction of movement of the upsetting ram, into which a bolt fixed to the upsetting ram engages.

Moreover there may be a bore in the end wall of the housing serving for the introduction of the tube into the clamp jaws, the said bore receiving a leaf spring which engages under the pressure roll of the guide body, its free ends resting on the rear of the upsetting lever and of the end wall of the housing respectively.

A cutting-off device for the tube, may consist of a blade and counter-blade arranged on the handles of the housing and of the upsetting lever respectively. The upsetting lever may be shorter than the clamp lever. Also there may be provided between the side walls of the housing an adjustable eccentric for adjusting the upsetting ram, bores may be provided in the handle of the housing for fixing the device on to a table.

In the accompanying drawings there is shown an embodiment of the invention by way of example, the drawing being a diagrammatic representation of a side view which is partly cross-sectional.

The device according to the invention has two handles 1, 10, the handle 1 being constructed as clamp lever. The handle 10 ends in a housing 11 which is open at the top; at the bottom of the housing the lower clamp jaw 4 is arranged so as to be adjustable in height by the adjusting screw 20 and the fixing screw 21. The upper clamp jaw 3 has a guide body 8 extending upwardly and capable of sliding between the side walls of the housing 11. The said guide body carries a pressure roller 9 in the vicinity of its centre, the said pressure roller being held in abutment against a pressure clamping portion 7 of the clamp lever 1 by a leaf spring 5 forming resilient means which engages under it, the clamp lever 1 being arranged in the side walls of the housing 11 so as to be pivotable about an axis 26. In the front end wall of the housing there is a through bore 17 by which the pipe which is to receive the bulging is inserted into a cylindrical clamping chamber 14 formed by the clamp jaws 3, 4. At the end of the clamp jaws 3, 4 an upsetting chamber 13 is arranged in which the upsetting ram 6 is carried. In the upsetting ram 6 a pin 22 is fixed, the diameter of which corresponds to the inner diameter of the pipe to be upset. The upsetting ram 6 has a recess 23 the diameter of which corresponds to the external diameter of the tube which is to be upset. At its free end the upsetting ram 6 is fork-shaped and between the ends of the fork a bolt 16 is fixed which engages through a slit-shaped through bore 15 of the arm 24 of the upsetting lever 2 which is arranged between the side walls of the housing so as to be pivotable about an axis 25. The upsetting lever 2 is held in abutment against the underside of the clamp lever 1 by the spring 5 resting on its rear, the free end of which abuts on the front end wall of the housing. At the end of the fork-shaped attachment of the upsetting ram 6 is arranged an eccentric 18 carried between the side walls of the housing 11, by the adjustment of which the stroke of the upsetting ram 6 can be altered. Bores 19 are arranged in the handle 10 of the housing 11 by which the device can be screwed to a support, for instance a table. A cutting-off device 12 for the tube, consisting of a blade and counter-blade, is provided on the clamp lever 1 and the handle 10.

The device according to the invention functions as follows: after the pipe which is to be provided with a bulge has been inserted into the clamp jaws and into the upsetting ram, the pincers are closed, whereby first the clamp lever *via* its pressure cams closes the clamp jaws and clamps the tube. On further closing movement of the pincers the upsetting lever abutting against the rear side of the clamp lever carries the upsetting ram into its end position, and in the chamber formed by the clamp jaws the required bulging of the pipe takes place. When the two handles are released, the leaf spring effects a return to the initial position. The cutting-off of the tube to the length desired at the time takes place by the blades arranged on the two handles.

I claim:

1. A manually operable tube upsetting tool for producing an annular bulge serving as a sealing element at the end of a plastics tube, comprising a pair of mutually opposed tube clamping jaws mounted so as to define a substantially cylindrical tube clamping chamber at the inner end of which is an upsetting chamber, a housing in which the jaws are movable away or toward a tube so as to engage a tube being upset, said housing having an extension forming one handle, an actuating lever pivotally mounted on the housing being an extension forming a clamping portion and a further extension forming a second handle, said clamping portion acting so as to move at least one jaw into clamping engagement with the tube, an upsetting ram axially movable into the clamping chamber, an upsetting lever pivotally mounted so that one end is linked to the ram and the other end is pressed by resilient means against the actuating lever, whereby a gripping force being applied across the two handles causes the upsetting ram to force the end of a clamped tube into the upsetting chamber.

2. A tool as claimed in claim 1 wherein the ram has a pin which is arranged to be inserted to engage the end of the tube and wherein on the outer side of the said upsetting ram there is provided a recess corresponding to the wall thickness of the tube, surrounding the pin, for receiving the free end of the tube.

3. A tool as claimed in claim 1, wherein one clamping jaw is fixed in the bottom of the housing so as to be adjustable in height and the other clamping jaw has a guide body slidingly received between the side walls of the housing, in the approximate centre of which a pressure roller is arranged which is held by spring action in abutment against the clamping portion of the clamp lever.

4. A tool as claimed in claim 1, wherein the upsetting lever at the end linked to the upsetting ram is provided with a slot lying transversely to the direction of movement of the upsetting ram into which a pin engages which is fixed to the upsetting ram.

5. A tool as claimed in claim 3 wherein the outer wall of the housing has a bore for the insertion of the tube into the clamping chamber and wherein a leaf spring is provided as the resilient means which engages under the pressure roller of the guide body and one end of which spring rests on the upsetting lever and the other end of which rests on the end wall of the housing.

6. A tool as claimed in claim 1, wherein on the handles there is a cut-off device for the tube consisting of a blade and a counter-blade.

7. A tool as claimed in claim 1, wherein the upsetting lever is shorter than the clamp lever.

8. A tool as claimed in claim 1, wherein between the side walls of the housing there is mounted an adjustable eccentric for setting the stroke of the upsetting ram.

9. A tool as claimed in claim 1, wherein in the handle extending from the housing there are holes for fixing the tool on to a bench.

* * * * *